(12) United States Patent
Bascom et al.

(10) Patent No.: US 7,413,136 B2
(45) Date of Patent: Aug. 19, 2008

(54) FIBER CHOPPER WITH IMPROVED IDLER ROLL

(75) Inventors: Randall Clark Bascom, Wauseon, OH (US); Glenn Allen Torbett, Charleston, TN (US)

(73) Assignee: Johns Manville, Denver, CO (US)

( * ) Notice: Subject to any disclaimer, the term of this patent is extended or adjusted under 35 U.S.C. 154(b) by 245 days.

(21) Appl. No.: 11/238,463

(22) Filed: Sep. 29, 2005

(65) Prior Publication Data

US 2007/0069055 A1    Mar. 29, 2007

(51) Int. Cl.
    *B02C 18/16* (2006.01)
(52) U.S. Cl. .......................... 241/30; 241/235; 241/293
(58) Field of Classification Search .................. 241/30, 241/222, 225, 235, 242, 293; 83/37, 347, 83/913, 950
See application file for complete search history.

(56) References Cited

U.S. PATENT DOCUMENTS

| 6,708,592 | B2 * | 3/2004 | Bascom et al. | ............. 83/436.3 |
| 7,152,514 | B2 * | 12/2006 | Bascom et al. | ................ 83/109 |
| 2007/0044607 | A1 * | 3/2007 | Bascom et al. | ................. 83/37 |

* cited by examiner

*Primary Examiner*—Mark Rosenbaum
(74) *Attorney, Agent, or Firm*—Robert D. Touslee (57) ABSTRACT

A method and apparatus for chopping long unwound items like fiber, fiber strands, yarn, etc. having an idler roll for pressing the item(s) against a backup roll for pulling the item(s) into the chopper, the idler roll being an assembly allowing the idler roll to pivot around a pin inside the idler roll assembly to keep the surface of the idler roll in proper contact with the items being chopped.

28 Claims, 5 Drawing Sheets

FIBER CHOPPER WITH IMPROVED IDLER ROLL

BACKGROUND

The present invention involves an improved chopper for chopping continuous or very long loose items such as fiber, fiber strands, yarn, wire, string, ribbon, tape and the like by pulling the item(s) into the chopper while the loose items are held tightly against the surface of a rotating backup roll with a rotating idler roll biased against the backup roll and carrying the item(s) on into a nip between a rotating blade roll and the rotating backup roll where they are separated into short pieces. More specifically the present invention involves a chopper having an improved idler roll which allows the idler roll to reliably self align with the surface of a back up roll to more reliably and more effectively hold down and pull item(s) being pulled and chopped such as loose wet or dry strands of glass fibers with, or without, a chemical sizing thereon.

It has long been known to chop continuous fibers or fiber strands into short lengths of about 3 inches or shorter. Billions of pounds of such product including chopped glass fibers and fiber strands are produced each year in process and chopping apparatus such as disclosed in U.S. Pat. Nos. 5,970,837, 4,398,934, 3,508,461, and 3,869,268, the disclosures of which are incorporated herein by reference. The choppers disclosed in these patents comprise a blade roll containing a plurality of spaced apart blades for separating the fibers into short lengths, a backup roll, usually driven, which the blades work against to effect the separation and which pulls the fibers or fiber strands and an idler roll to hold the fibers or fiber strands down onto the surface of the backup roll. In the chopped fiber processes disclosed in these patents, the chopper is usually the most productivity limiting equipment in the processes that are round the clock, 24 hours per day, type processes. Therefore, improvements in the chopper, which allow the chopper to pull and chop faster, for longer times between maintenance shutdowns, and/or to pull and chop more fibers or fiber strands at one time, have an extremely positive impact on productivity and production costs.

In the published prior art the idler roll has been mounted and held against the surface of the back up roll in a generally rigid manner and with a variable force such as a force applied by an air or hydraulic cylinder. The working surface of the idler roll has been knurled and chrome plated in the past to better grip the fibers or fiber strands to prevent the fibers or fiber strands from sticking to the roll and wrapping and to avoid having to shut the chopper down to remove the wrap. Normally several strands, up to 14 or more, are fed into the chopper, each strand containing 2000 or more fibers. As more fiber strands and fibers are fed into the chopper it becomes more difficult to pull all of the strands and fibers at the same speed, so more pressure is applied to the cylinder pushing the idler roll against the backup roll with more force. If all of the strands or fibers are not pulled at the same speed, the slower strands and fibers will have a greater fiber diameter which is unacceptable and the bushings of the slower strands frequently will not operate at the proper temperature causing more frequent breakouts and/or additional fiber diameter variations, both of which are unacceptable. Also, fiber slippage can cause some of the fibers to be cut to shorter lengths than desired resulting in an unacceptable product.

As the pulling speed is increased, and/or as the number of strands and fibers are increased, above about 3000-4000 ft./min. (FPM), depending on the product, the present state of the art choppers begin to vibrate and the idler roll begins to allow one or more of the strands to slip some thus reducing the pulling speed of one or more of the strands. Also, if all of the strands are not pressed between the idler roll and the elastomer layer of the backup roll, a strand can slip partially out of the nip leaving some of the fibers unchopped, producing double cuts and stringers in the chopped product and causing the product to be scrapped. This condition worsens as the backup roll and blades become worn with use, typically about 6-24 hours following a chopper rebuild in which the blade roll is replaced with a roll having new blades and the backup roll is replaced with either a refurbished or new backup roll. The backup roll has a working layer of polyurethane at least about a half inch thick on the surface of a metal wheel. As the chopper life increases the surface of the backup roll becomes chopped up due to the blades pressing and cutting into the polyurethane.

Periodically the backup roll must be removed and either the polyurethane layer turned down on a lathe or sander or must be replaced with a new layer of polyurethane. It would be very desirable to be able to run the chopper at higher speed without vibration and strand slippage to make good chopped fiber than is possible with the current state of the art choppers because the remainder of the process is capable of producing fiber that can be pulled much faster in terms of speed and pounds of fiber per hour than is currently possible. Also, in the preferred state of the art chopper the idler roll mount is exposed to broken fiber and sizing being thrown from the various rolls on the chopper and must be frequently cleaned to avoid serious malfunction at current speeds.

An improved idler roll mount is disclosed in U.S. Pat. No. 6,723,670, and this mount works very well but requires the entire yoke to pivot to keep the idler roll in the desired alignment and this added inertia is a disadvantage, especially at high pulling speeds above about 3000 FPM. It is known that the reason for certain strands slipping on the idler/backup roll of the current choppers is the manner in which the idler roll is mounted, the manner in which the force is applied to hold the idler roll onto the surface of the backup roll and the fact that the peripheral surface of a new and used backup rolls often have a slight taper from side-to-side or misalignment with the idler roll, either initially or after the new backup roll has been in use for a few hours. A mechanism that would achieve at high pulling speeds with the same desired alignment now achieved at lower pulling speeds with this device would be highly desirable and valuable.

SUMMARY OF THE INVENTION

The present invention includes a chopper having an improved idler roll assembly for a chopper for separating long lengths of one or more unwound items selected from a group consisting of fibers, fiber strands, wires, strings, tape(s), strip(s) and ribbon(s) into short lengths while one or more of, preferably a plurality of, the long lengths of material are pulled into the chopper in an unwound form at speeds exceeding 1,000 FPM, preferably at speeds exceeding 2000 FPM by a rotating idler roll pressing the item(s) against the peripheral surface of an elastomer layer on the peripheral surface of a rotating backup roll which carries the item(s) on into a nip between the elastomer layer and a rotating blade roll. The item(s) being chopped can be either dry or wet with or without a chemical sizing on the surface of the item(s). The chopper having an improved idler roll mount assembly comprises a blade roll having a plurality of spaced apart blades in its peripheral surface, a backup roll having an elastomeric working layer on its periphery, and an idler roll, preferably having a knurled surface.

The chopper for separating long lengths of unwound item(s) selected from the group consisting of fibers, fiber strands, string, yarn, wire, tape and ribbon into short pieces comprising a frame having a front plate on an outboard, operating side of the chopper, a rotatable backup roll outboard of the front plate, the backup roll having an elastomeric peripheral working surface, a rotatable blade or cutter roll outboard of the front plate, a rotatable idler roll mounted outboard of the front plate for pressing the item(s) against said working surface of the backup roll and an idler roll mount for holding the idler roll and applying a force to press the idler roll against the item(s) to be chopped and the working layer on the backup roll as the latter rotates. The improved chopper has an idler roll assembly comprising an idler roll, a hub and pin for pivotally attaching to the axle and at least one bearing between the idler roll and the hub to permit the idler roll to rotate around the hub while the hub is free to pivot to keep the idler roll in contact with the items on the working surface. The improved chopper can also optionally further comprise an idler roll mount assembly comprising a support arm for mounting the idler roll assembly. The idler roll assembly can optionally further comprise a biasing member for impeding the idler roll from pivoting downwardly when the idler roll is raised off of the working surface of the backup roll. The improved chopper can also optionally further comprise a fluid purge system that forces a fluid through the interior of the idler roll assembly to prevent foreign matter from entering the idler roll assembly and impeding pivoting and/or rotation of the idler roll and also optionally through a portion of the idler roll mount assembly to prevent foreign matter from getting into moving parts exposed to the atmosphere outside the chopper. This fluid purge system would also provide some cooling effect to help increase the longevity of rotating idler roll components.

The invention also includes an idler roll assembly for a chopper comprising an idler roll, a hub and pin for pivotally attaching to the axle and at least one bearing between the idler roll and the hub to permit the idler roll to rotate around the hub while the hub is free to pivot to keep the idler roll in contact with the items on the working surface. The idler roll assembly can optionally further comprise a biasing member for impeding the idler roll from pivoting downwardly when the idler roll is raised off of the working surface of the backup roll. The idler roll assembly can optionally further comprise a fluid purge system that forces a fluid through the interior of the idler roll assembly for some cooling effect and to prevent foreign matter from entering the idler roll assembly and impeding pivoting and/or rotation of the idler roll. The idler roll assembly can further comprise at least one bearing, typically two bearings, located between the hub and the idler roll.

The invention also comprises a method of separating long lengths of unwound item(s) selected from the group consisting of fibers, fiber strands, string, yarn, wire, tape and ribbon into short pieces comprising feeding one or more of said item(s) into a chopper, the chopper being those described in a previous paragraph of this section and containing an idler roll assembly as described above.

When the word "about" is used herein it is meant that the amount or condition it modifies can vary some beyond that so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without unexpected characteristics, those embodiments are within the meaning of the term about as used herein. It is not difficult for the skilled artisan or others to determine whether such an embodiment is either as might be expected or, because of either a break in the continuity of results or one or more features that are significantly better than reported by the inventor, is surprising and thus an unobvious teaching leading to a further advance in the art.

DETAILED DESCRIPTION OF THE INVENTION

Figure 1:
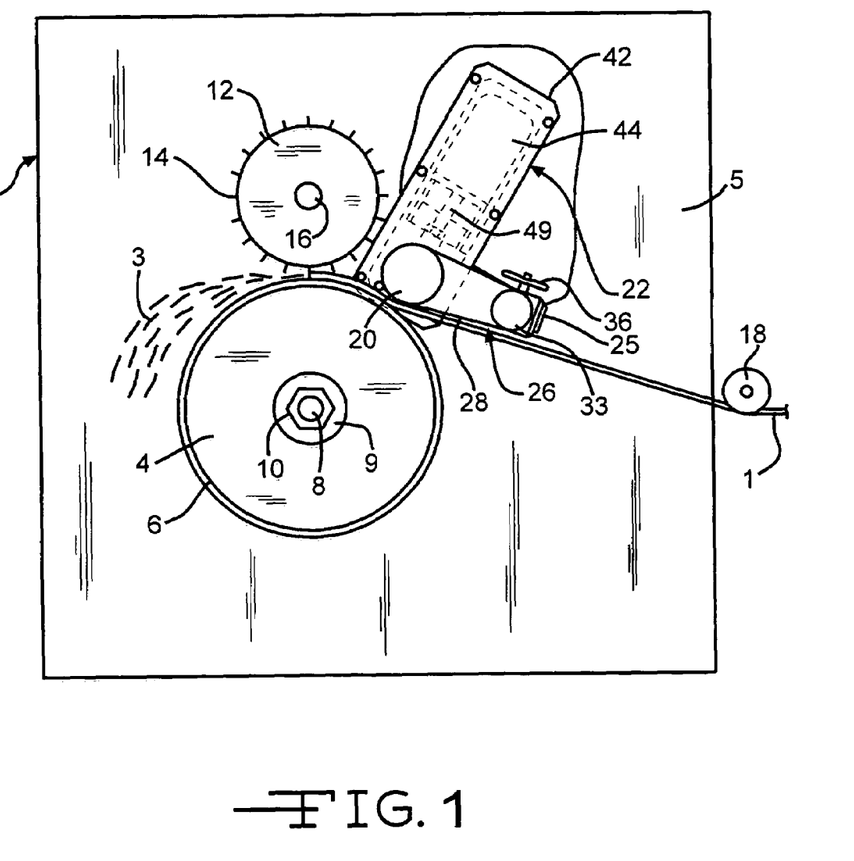
FIG. 1 is a front view of a chopper of the present invention with a portion cut away to show a part of a mount assembly for the idler roll assembly of the invention.

FIG. 1 shows a chopper 2 for separating long items such as fibers, fiber strands, strings, wires, tape(s) or ribbon(s) 1 into short lengths 3. Typically the short lengths are about 4 or 5 inches or less, but can be longer if the diameter of the blade roll 12 and the backup roll 4 are more than about one meter. For purposes of describing the invention an improved chopper 2 for separating long fiber strands, such as glass fiber strands, is illustrated. Such a chopper typically comprises a backup roll 4 having an elastomer layer 6 on its outer periphery and mounted on a rotating spindle 8 and held on with a large washer 9 and nut 10, a blade roll 12 having blades 14 spaced apart around its outer periphery and mounted on a rotating spindle 16 in a similar manner as the backup roll 4. The typical chopper also comprises a front plate 5, which preferably is an element of a conventional chopper frame (not shown) and a rotating idler roll 20 having a knurled surface that is pressed against the fiber strands 1 and the elastomer layer 6 of the backup roll 4. The idler roll 20 serves the purpose of pressing the fiber strands 1 against the rotating backup roll 4 which will help pull the fiber strands 1 at the desired speed into the chopper 2. Typically a strand separator and guide roll 18 mounted on or off the chopper is used to separate the fiber strands 1 and to guide them to the desired location on the backup roll 4. The improved chopper 2 of the present invention comprises a novel idler roll assembly 20 and an idler roll mount assembly 22. The front plate 5 is partially cut away in FIG. 1 to show the parts of the idler roll mount assembly 22 that are behind the front plate 5.

A typical idler roll mount assembly 22, illustrated in FIGS. 1-5 and, supports the idler roll assembly 20, shown in FIGS.

6-8, of the present invention. A support arm 26, that can be a part of either the roll mount assembly 22 or the idler roll assembly 20, surrounds and is held fast onto an outer portion 60 of a main shaft 55 with a quick disconnect pin 62, such as a unit identified by McMaster-Carr™ as #90293A313 stainless steel positive locking quick release T-handle pin, to allow the exposed idler roll parts to be quickly removed and replaced without opening the housing of the chopper 2. The main shaft 55 is a part of, or attached to, a torque arm 43 (see FIG. 4) of the idler roll mount assembly 22 that will be described later. The support arm 26 can be all one piece, or as shown, can be made from two or more pieces that are than attached together in any suitable manner. The support arm shown in FIG. 5 comprises an arm 28 with a passage 29 down its axis, an axle 30 having an axis 24, the axle 30 attached to a first surface 31 of the arm 28 near an optional first end 32 of the arm 28, and a socket 33 attached to a second end 34 of arm 28. The axle 30 has a cavity 35 in its unattached end and a round hole 36 running completely through the axle 30 perpendicular to the axis 24 of the axle 30. The hole 36 is located in the axle 30 such that a portion of the surface of the hole 36 is near a bottom of the cavity 35 and spaced a substantial distance from the first surface 31 of the arm 28.

The socket 33 is cup shaped having a smooth cylindrical cavity 15 therein and is attached to the arm 28 by any suitable method, such as by welds 7. A side of the cup shaped socket 33 adjacent the support arm 28 contains a passage 21 that links up with the passage 29 in the support arm 28, both passages being for carrying a cooling fluid like air or water to bearings in the idler roll assembly 20 and to pressurize the interior of the idler roll assembly 20 to provide exhaust of the fluid out of all small openings in the idler roll 20 to prevent water, binder, and dirt from entering and reaching moving parts in the idler roll assembly 20. The axle 30 has a passage 13 along its axis 24 for a portion of its length. The passage aligns and communicates with a passage 37 in the arm 28, the passage 37 oriented generally perpendicularly, and communicating, with the passage 29. The other end of the passage 13 communicates with a generally perpendicular passage 17 that extends entirely through the axle 30 generally perpendicular to the axis 24. One or more passages 19 communicate with the passage 17 and extend to the surface of the unattached end of the axle 30, lying between the cavity 35 and the outer circumferential surface of the axle 30. The arm 28 optionally has a removable first end 32 that bolts onto the arm 28 with bolts 23 (see FIG. 6). An outboard end portion 60 of the main shaft 55 fits into the cavity 15 of the socket 33 and is held fixed to the socket 33 with a quick release pin 62 (see FIG. 2).

Figure 2:
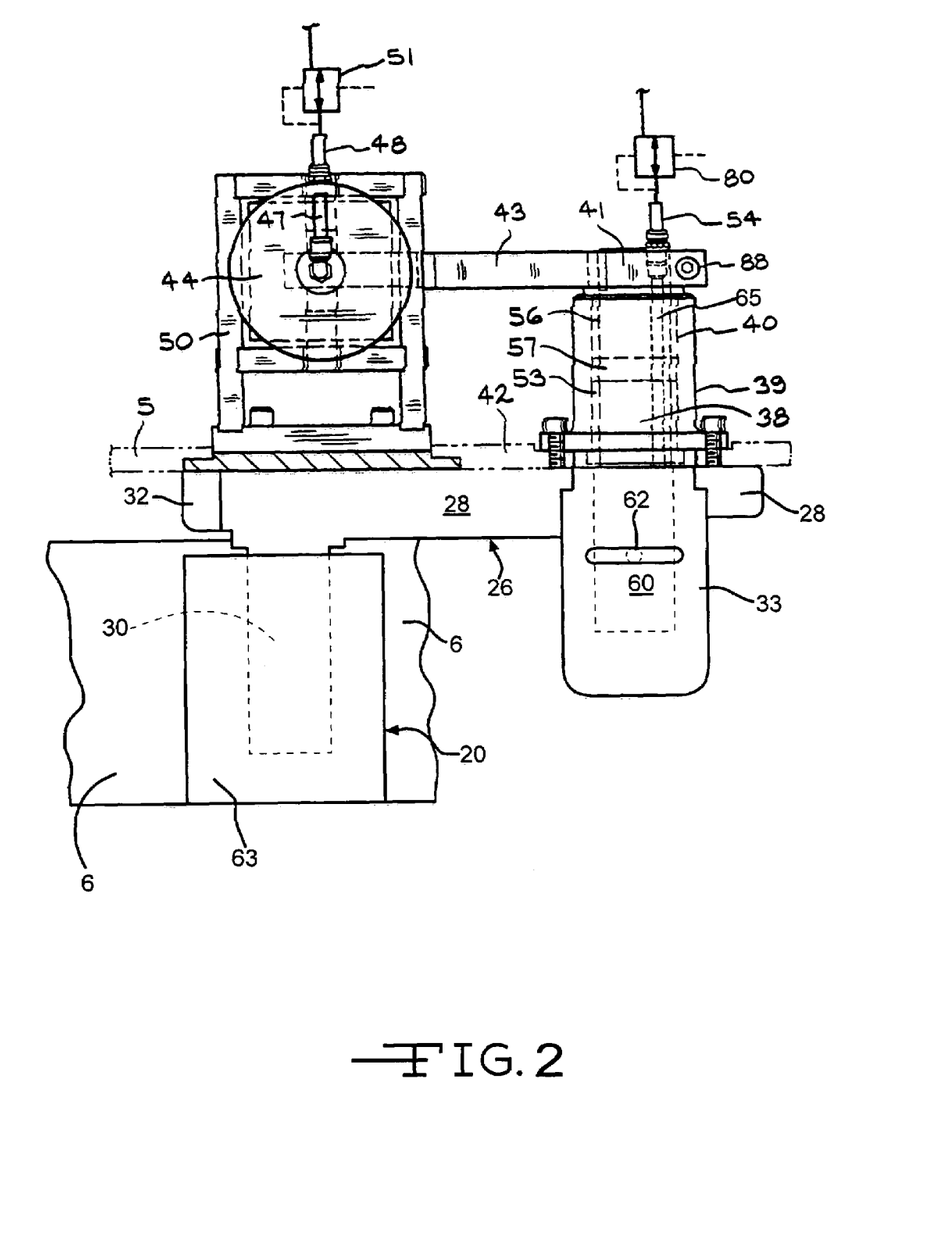
FIG. 2 is a plan view of the mount assembly shown in FIG. 1.
Figure 3:
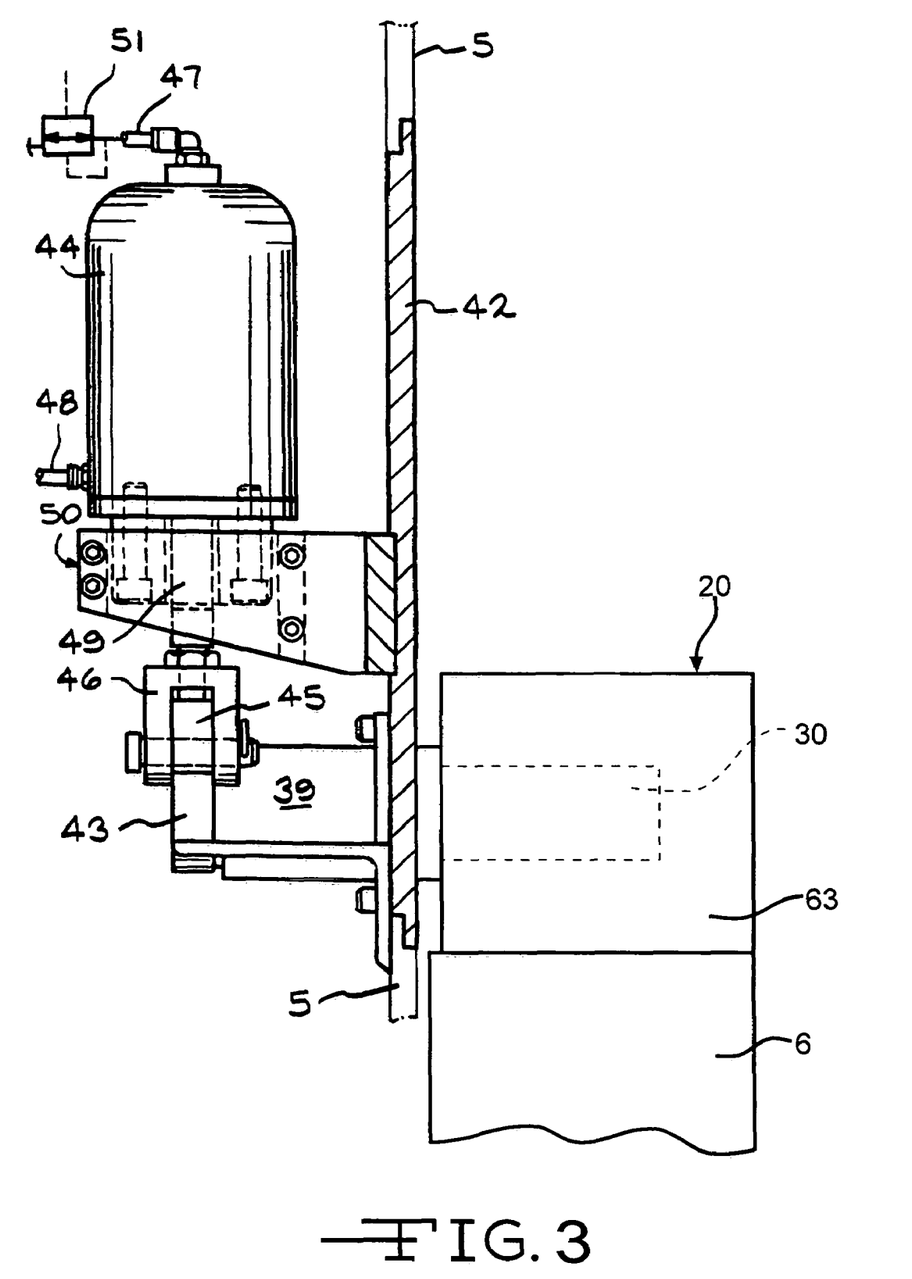
FIG. 3 is an end view of the idler roll mount assembly shown in FIGS. 1 and 2.
Figure 4:
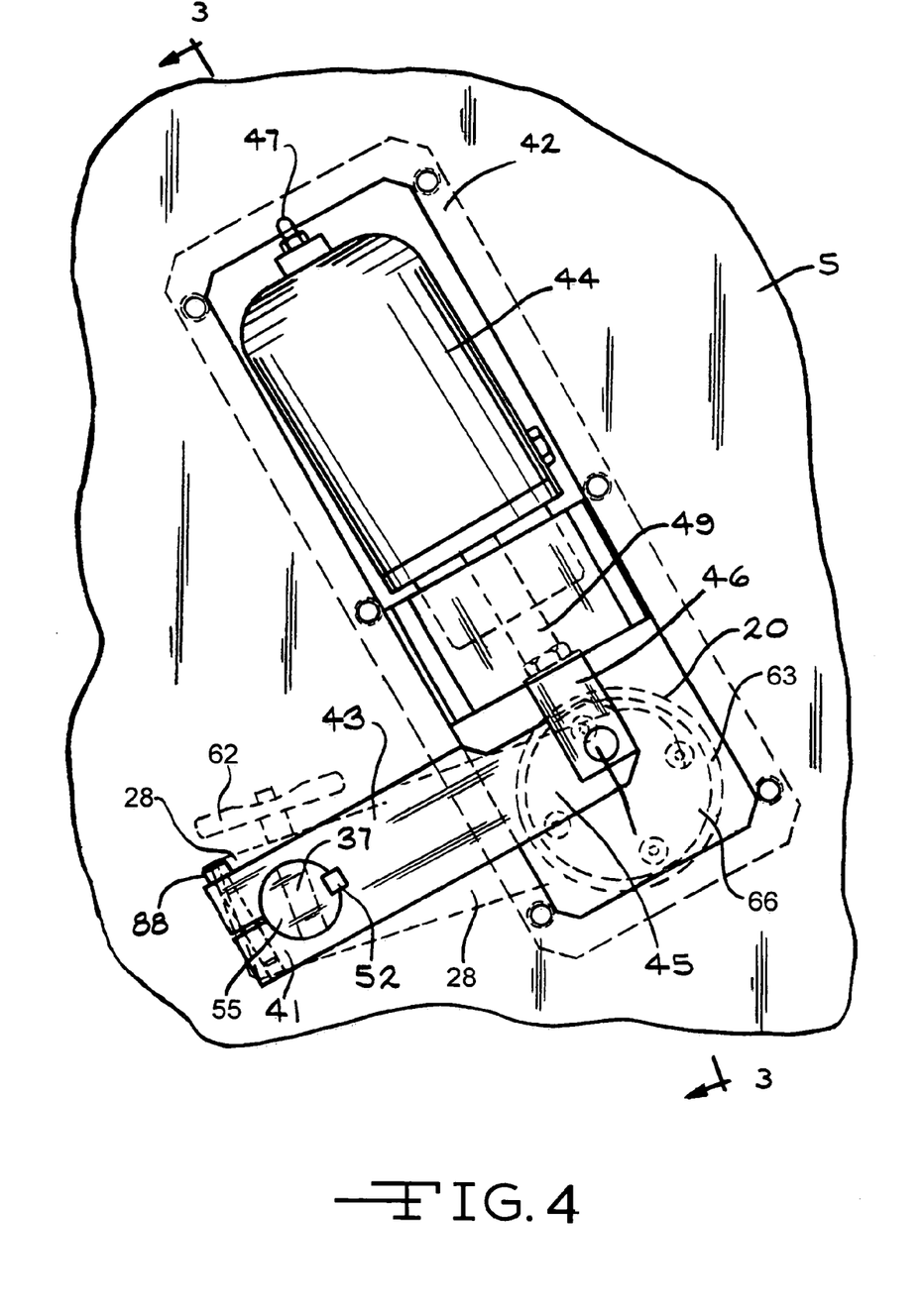
FIG. 4 is a back view of the idler roll mount assembly shown in FIG. 1.
Figure 5:
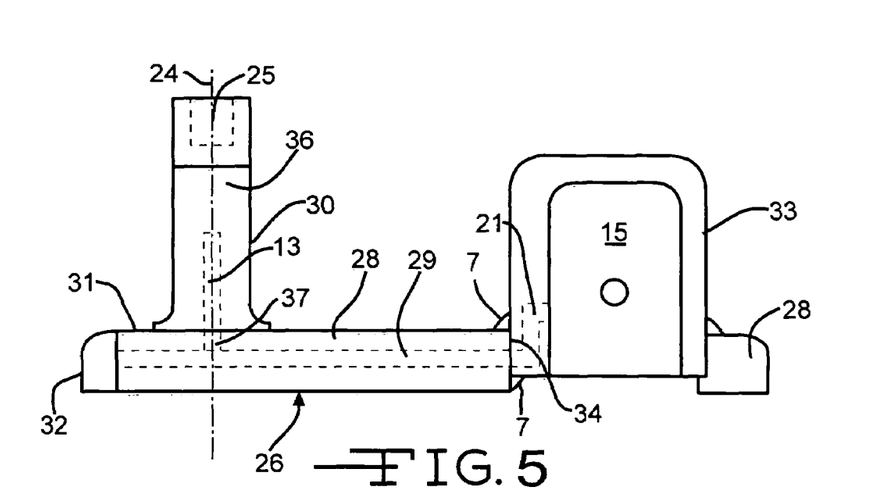
FIG. 5 is a plan view of an arm and axle for the idler roll assembly of the invention.
Figure 6:
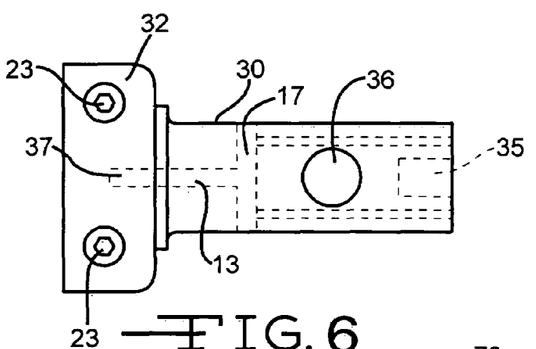
FIG. 6 is an end view of the arm and axle; shown in FIG. 5, for the idler roll assembly of the invention.

The idler roll mounting assembly 20 is shown in FIGS. 1-4. An inboard portion 38 of a main shaft 55 is preferably held generally horizontally in a rotatable manner by an inboard housing 39 attached to an interior surface of the frame or front plate 5 of the chopper 2, the housing 39 having a cylindrical opening 40 therethrough, an axis of which aligns with an axis of the cup shaped socket 33. The housing 39 is of a length to allow an inboard portion 38 of the main shaft 55 to extend beyond an inboard end of the housing 39 at least about 0.5 inch to permit any means of applying a torque to the main shaft 55, such as a first end 41 of a torque arm 43 to be fixedly attached to the inboard portion 38 of the main shaft 55 in any suitable manner, such as by a key 52 in a slot or keyway as shown in FIG. 4 and a tightening bolt 88 shown in FIGS. 2 and 4. A first bushing 53 and a second bushing 56, preferably both being lubricated bushings, with a gap 57 therebetween surround the main shaft 55 in the cylindrical opening 40 of the housing 39 to allow free and stable rotation of the main shaft 55.

A fluid cylinder 44, preferably an air cylinder, is located inside the chopper 2 housing on the inboard side of the plate 5 by any suitable means, such as with a cylinder mount 50, with the cylinder rod 49 attached to a clevis 46 attached to a second end portion 45 of the torque arm 43 opposite the first end portion 41. Air or other fluid is fed to the cylinder 44 via either one of a first line 47 or a second line 48 depending on whether the idler roll assembly 20 is being pressed against the elastomer working layer 6 or backed away from the working layer 6. A first fluid pressure regulator 51 is connected to line 47, which is used to regulate the amount of force applied to the torque arm 43 which in turn regulates the force the idler roll assembly 20 applies to the working layer 6 and the item being chopped such as strands 1. The force on the idler roll assembly is applied via the outboard end portion 60 of the main shaft 55, residing inside the cavity 15 of the cup shaped socket 33 and held fixed to the socket 33 with a locking pin 62 running through the walls of the socket 33 and through a hole in the main shaft 55. Thus, when the torque arm 43 rotates the main shaft 55, the latter in turn moves the support arm 26 to force the idler roll assembly 20 against the working layer 6, or to lift the idler roll assembly 20 off of the working layer 6.

Figure 7:
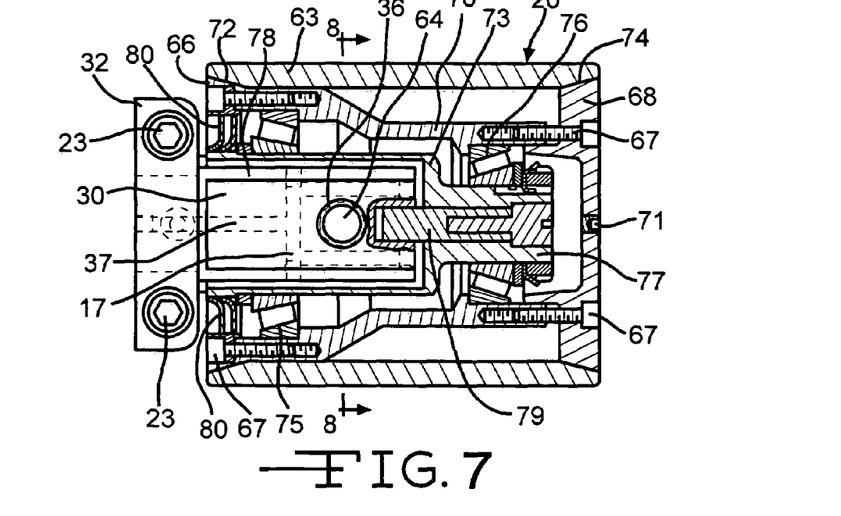
FIG. 7 is a cross sectional view of the idler roll assembly of the invention, including the axle shown in FIGS. 5 and 6.
Figure 8:
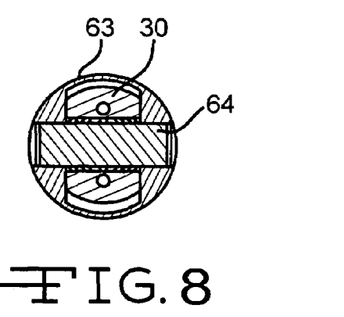
FIG. 8 is a cross sectional view of the idler roll assembly along lines 8-8 of FIG. 7.

The idler roll assembly 20 is shown in detail in FIGS. 7 and 8. The idler roll 63 can pivot vertically, in one dimension, as shown by the phantom lines, to adapt to any taper on the working surface 6 of the backup roll 4, a taper that frequently develops during the life of the working surface 6. A pin 64 passes through the hole 36 and acts as a pivot for the idler roll assembly 20 mounted on the axle 30. The idler roll assembly 20, including the axle 30, has the ability to pivot up to at about plus or minus 1 to 2 degrees. The idler roll pin 64 is held in place with an inboard retainer surface 60 of cylindrical frame 70 and an outboard retainer plate 68 with bolts 67 passing through both plates and threaded into a cylindrical frame 70. Tapered circumferential surfaces 72,74 on the interior ends of the idler roll 64 match up with tapered, outer circumferential surfaces on the retainer plates 66,68 to hold the idler roll 64 firmly in place when the bolts 67 are tightened into the cylindrical frame 70. The cylindrical frame 70 mounts over an inboard bearing 75 and an outboard bearing 76 spaced from the inboard bearing 75, both bearings 75,76 in contact with a cup shaped hub 73. This embodiment uses tapered bearings, but most typically ball bearings are used to minimize noise and heat.

The hub 73 fits around the axle 30 and is held in a pivoting way with the pin 64 that passes through holes in the hub 73 and through the hole 36 in the axle 30. The inside diameter of the hub 73 is greater than the outside dimension of the axle 30 forming a gap 78 that permits the hub 73 to pivot the desired amount with respect to the axle 30. The hub 73 optionally has a top hat 77, that part that is adjacent to the cavity 35 in the axle 30, an extension having a hole through which a coil spring or elastomeric biasing member 79 can be inserted to extend at least part way into the cavity 35. The diameter of the biasing member 79 should be approximately equal to the interior diameter of the cavity 35 and that of at least some of the hole in the optional top hat 77 so that the biasing member 79 fits snuggly into the cavity 35 and the hole in the top hat 77. The biasing member 79 can be held in place in many ways and in the embodiment shown in FIG. 7, it is held in place with a threaded bolt 82 that engages a threaded portion 81 of the top hat 77.

The purpose of the optional biasing member 79 is to impede the idler roll 63 from dropping down, pivoting down, when the idler roll 63 is raised off of the working surface 6 with the idler roll mounting assembly 22, usually to replace the backup roll 4 or idler roll assembly 63 when needed. The biasing member provides sufficient bias to support the effective weight or force tending to pivot the idler roll axis with respect to the axis of the axle 30. The idler roll can still be caused to pivot with an external force, but most typically will not pivot of its own accord. As is conventional, the surface of the idler roll 63 is knurled and this knurling wears in operation to a degree that fibers or fiber strands begin to stick and wrap on the idler roll 63. When this happens, or is likely to happen, the chopper is stopped and the idler roll assembly 20 is replaced by removing the quick release T-handle pin 62 and replacing with a new or reconditioned idler roll assembly 20 followed by reinstalling the quick release pin 62. This is more easily accomplished if the idler roll is held in a neutral position with the biasing member 79. Also, this biasing helps keep the idler roll axis properly oriented to allow quick replacement of the backup roll 4 with reduced encumbrance or interference by contact with the idler roll assembly 20.

Optionally, the idler roll mount assembly 22 and the idler roll assembly 20 can also be equipped with a fluid purge system, typically an air purge system, shown in FIGS. 2 and 3, to prevent water, chemical sizing and fiber dust that are prevalent in the air surrounding the idler roll assembly 20 and the idler roll mount assembly 22 from entering the bushings in the housing 39, the socket 33 and/or the bearings 75,76 and reducing the freeness of rotation of the moving parts in the assemblies. Circular seals 80 are effective in preventing most material from getting to the bearings 75,76, but positive air pressure inside the idler roll assembly 20 improves the interior environment. The air purge system comprises a purge air line 54 connected to the end of the inboard portion 38 of the main shaft 55 where it aligns with a first channel 65 that runs through the interior of the main shaft 55 and empties into the interior of socket 33, cavity 15, and into passage 29 in the support arm 26. Purge air flows through passages 29 and 37 into the axle 30 and on into the gap 78 between the axle 30 and the hub 73 and some exits out small holes at the rear of the idler roll assembly 20 in the inboard cap plate 66 and also optionally through a hole 71 in the outboard cap plate 68. The proper air pressure to achieve these results while conserving high-pressure air is regulated with a second pressure regulator 80 in the second air line 54.

While a most typical purge air system of the present invention has been shown, once given this concept, it will be obvious that many modifications can be made to this system to get the air, or other fluid such as water or other gas, to the desired locations to achieve the same or similar result. Other modifications to the idler roll assembly 20 will also be obvious given the disclosure above.

When the knurled surface of the idler roll 63 becomes worn it becomes necessary to replace the idler roll 63 with a new or rebuilt one. To do this the above described procedure can be followed, but to do so more quickly, the removable pin 62 removed and the sub-assembly comprising the support arm 26 and the idler roll assembly 20 is removed and replaced with a new or reconditioned sub-assembly.

In the embodiment disclosed herein, many of the parts of the novel idler roll mount assembly 22 are contained within the chopper cabinet behind the front plate 5 to protect the parts from the hostile environment on the outside of the chopper. However, if one wanted to put up with the problems caused by the environment outside the chopper cabinet in front of the front plate 5 more or all of the novel idler roll mount assembly could be located outside the chopper cabinet.

It will be obvious to chopper artisans that the embodiments and structures disclosed herein can be modified in several ways without significantly changing the result. For example, instead of an air purge system, a lubricating system using a lubricant compatible with the chopped fiber product can be used. Also, different bearings, biasing members and fastening means than those disclosed can be used. All such modifications are within the concept and scope of the present invention described in the following claims.

The invention claimed is:

1. A chopper for separating long lengths of one or more unwound items selected from the group consisting of fibers, fiber strands, string, yarn, wire, tape and ribbon into short pieces comprising a frame having a front plate on an outboard, operating side of the chopper, a rotatable backup roll outboard of the front plate, the backup roll having an elastomeric peripheral working surface, a rotatable blade or cutter roll outboard of the front plate, a rotatable idler roll mounted outboard of the front plate for pressing the one or more items against said working surface of the backup roll and an idler roll mount for holding the idler roll and applying a force to press the idler roll against the one or more items to be chopped and the working layer on the backup roll as the latter rotates, the improvement comprising an idler roll assembly comprising an idler roll, an axle, a hub and pin for pivotally attaching to the axle and at least one bearing between the idler roll and the hub to permit the idler roll to rotate around the hub while the hub is free to pivot to keep the idler roll in contact with the one or more items on the working surface.

2. The chopper of claim 1 wherein the idler roll assembly further comprises a biasing member for impeding the idler roll from pivoting downwardly when the idler roll is raised off of the working surface of the backup roll.

3. The chopper of claim 2 further comprising a fluid purge system that forces a fluid through the interior of the idler roll assembly to prevent foreign matter from entering the idler roll assembly and impeding pivoting and/or rotation of the idler roll.

4. The chopper of claim 3 wherein the fluid is air at a pressure above atmospheric pressure external of the idler roll.

5. The chopper of claim 2 wherein the at least one bearing located between the hub and the idler roll comprises an inboard bearing and an outboard bearing spaced apart from the inboard bearing.

6. The chopper of claim 2 further comprising a circular frame surrounding, but spaced from, the axle, at least one bearing located between the circular frame and the hub.

7. The chopper of claim 1 further comprising a fluid purge system that forces a fluid through the interior of the idler roll assembly to prevent foreign matter from entering the idler roll assembly and impeding pivoting and/or rotation of the idler roll.

8. The chopper of claim 7 wherein the at least one bearing located between the hub and the idler roll comprises an inboard bearing and an outboard bearing spaced apart from the inboard bearing.

9. The chopper of claim 7 further comprising a circular frame surrounding, but spaced from, the axle, at least one bearing located between the circular frame and the hub.

10. The chopper of claim 7 wherein the fluid is air at a pressure above atmospheric pressure external of the connector.

11. The chopper of claim 1 wherein the at least one bearing located between the hub and the idler roll comprises an inboard bearing and an outboard bearing spaced apart from the inboard bearing.

12. The chopper of claim 1 further comprising a circular frame surrounding, but spaced from, the axle, at least one bearing located between the circular frame and the hub.

13. A chopper for separating long lengths of one or more unwound items selected from the group consisting of fibers, fiber strands, string, yarn, wire, tape and ribbon into short pieces comprising a frame having a front plate on an outboard, operating side of the chopper, a rotatable backup roll outboard of the front plate, the backup roll having an elastomeric peripheral working surface, a rotatable blade or cutter roll outboard of the front plate and a rotatable idler roll outboard of the front plate for pressing the one or more unwound items against said working surface of the backup roll and an idler roll mount for applying a force to press the idler roll against the one or more unwound items to be chopped and the working layer on the backup roll as the latter rotates, the improvement comprising a support arm and an idler roll assembly comprising:

a) a support arm pivotally mounted and comprising an axle, b) an idler roll assembly comprising an idler roll, a hub and pin for pivotally attaching to the axle and at least one bearing between the idler roll and the hub to permit the idler roll to rotate around the hub while the hub is free to pivot to keep the idler roll in contact with the one or more unwound items on the working surface.

14. The chopper of claim 13 wherein the idler roll assembly further comprises a biasing member for impeding the idler roll from pivoting downwardly when the idler roll is raised off of the working surface of the backup roll.

15. The chopper of claim 13 further comprising a fluid purge system that forces a fluid through the interior of a portion if the idler roll mount assembly and the idler roll assembly to prevent foreign matter from entering a support arm socket on the idler roll mount assembly and/or the idler roll assembly that would interfere with pivoting and/or rotation of the idler roll.

16. The chopper of claim 15 wherein the fluid is air at a pressure above atmospheric pressure external of the connector.

17. An idler roll assembly for a chopper comprising an idler roll, an axle having a hole therein to accept a pin, a hub and pin for pivotally attaching to the axle and at least one bearing between the idler roll and the hub to permit the idler roll to rotate around the hub while the hub is free to pivot to keep the idler roll in contact with one or more items on a working surface of a roll on the chopper.

18. The idler roll assembly of claim 17 further comprising a biasing member for impeding the idler roll from pivoting downwardly when the idler roll is raised off of the working surface of the backup roll.

19. The idler roll assembly of claim 18 further comprising a fluid purge system that forces a fluid through the interior of the idler roll assembly to prevent foreign matter from entering the idler roll assembly and impeding pivoting and/or rotation of the idler roll.

20. The idler roll assembly of claim 19 wherein the fluid is air at a pressure above atmospheric pressure external of the idler roll.

21. The idler roll assembly of claim 18 wherein the at least one bearing located between the hub and the idler roll comprises an inboard bearing and an outboard bearing spaced apart from the inboard bearing.

22. The idler roll assembly of claim 17 further comprising a fluid purge system that forces a fluid through the interior of the idler roll assembly to prevent foreign matter from entering the idler roll assembly and impeding pivoting and/or rotation of the idler roll.

23. The idler roll assembly of claim 22 wherein the fluid is air at a pressure above atmospheric pressure external of the connector.

24. The idler roll assembly of claim 22 wherein the at least one bearing located between the hub and the idler roll comprises an inboard bearing and an outboard bearing spaced apart from the inboard bearing.

25. The idler roll assembly of claim 17 wherein the at least one bearing located between the hub and the idler roll comprises an inboard bearing and an outboard bearing spaced apart from the inboard bearing.

26. A method of separating long lengths of one or more unwound items selected from the group consisting of fibers, fiber strands, string, yarn, wire, tape and ribbon into short pieces comprising feeding one or more of said one or more unwound items into a chopper comprising a frame having a front plate on an outboard, operating side of the chopper, a rotatable backup roll on the outboard of the front plate, the backup roll having an elastomeric peripheral surface, a rotatable blade roll outboard of the front plate, the blade roll having a plurality of blades spaced apart around its periphery for contact with said one or more unwound items and the elastomeric peripheral surface, pressing a rotatable idler roll outboard of the front plate against the one or more unwound items and said elastomeric peripheral surface of the backup roll, the idler roll mounted on a mount assembly that provides the force to press the idler roll against the one or more unwound items, the idler roll being an assembly comprising an idler roll, a hub and pin for pivotally attaching to the axle and at least one bearing between the idler roll and the hub to permit the idler roll to rotate around the hub while the hub is free to pivot to keep the idler roll in contact with the one or more unwound items on the working surface and rotating the backup roll and the blade roll to advance the items into a nip between one or more blades of the blade roll and the working surface of the backup roll to separate the one or more unwound items into short pieces.

27. The method of claim 26 wherein the idler roll assembly further comprises a biasing member for impeding the idler roll from pivoting downwardly when the idler roll is raised off of the working surface of the backup roll.

28. The method of claim 26 wherein the idler roll mount assembly further comprises a fluid purge system that forces a fluid through the interior of the idler roll assembly to prevent foreign matter from entering the idler roll assembly and impeding pivoting and/or rotation of the idler roll.

* * * * *